US008687305B2

(12) United States Patent
Katagiri et al.

(10) Patent No.: US 8,687,305 B2
(45) Date of Patent: Apr. 1, 2014

(54) ERROR RECOVERY PROCEDURE (ERP) USING ESTIMATED BEST SETTING IN FIRST RUN

(75) Inventors: Takashi Katagiri, Yokohama (JP); Pamela R. Nylander-Hill, Tucson, AZ (US); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 13/436,573

(22) Filed: Mar. 30, 2012

(65) Prior Publication Data

US 2013/0258516 A1 Oct. 3, 2013

(51) Int. Cl.
*G11B 5/09* (2006.01)

(52) U.S. Cl.
USPC .......... 360/53; 360/60; 360/73.04; 360/73.06

(58) Field of Classification Search
USPC .............. 360/53, 60, 69, 73.04, 128, 137, 90, 360/110, 121, 66, 323, 73.06, 77.16, 77.12, 360/31, 39; 714/48, 15, 16, 18
See application file for complete search history.

(56) References Cited

U.S. PATENT DOCUMENTS

| 5,047,872 A | 9/1991 | Heitmann |
| 6,600,616 B2 * | 7/2003 | McAllister et al. ............. 360/60 |
| 2002/0159180 A1 | 10/2002 | McAllister et al. |

* cited by examiner

*Primary Examiner* — Ali Neyzari
(74) *Attorney, Agent, or Firm* — Zilka-Kotab, PC

(57) ABSTRACT

In one embodiment, a tape drive system includes a read channel, a write channel, logic adapted for accessing data sets using the read channel and/or the write channel, logic adapted for counting each data set access using the read channel that used error recovery procedure (ERP), logic adapted for counting each data set access using the read channel that did not use ERP, logic adapted for counting each data set access using the write channel that used ERP, logic adapted for counting each data set access using the write channel that did not use ERP, and logic adapted for accessing subsequent data sets using the read channel and/or the write channel, wherein any subsequent data set access that uses ERP is accessed using an initial ERP step characterized by a first tape speed, wherein the first tape speed is selected at least partially based on the counts.

23 Claims, 5 Drawing Sheets

ERROR RECOVERY PROCEDURE (ERP) USING ESTIMATED BEST SETTING IN FIRST RUN

BACKGROUND

The present invention relates to reading data from tracks in a longitudinal tape-drive system, and more particularly, to using a best setting determined according to select tape operating parameters during error recovery procedure (ERP).

A tape drive is adapted to read and/or write data from/to a magnetic tape using a range of tape speeds which are preset in the tape drive (for example, one tape drive may operate at 14 different tape speeds). The error rate at each tape speed is potentially different for each tape cartridge and for each tape cartridge/drive combination. Typically, ERP performs a plurality of steps in trying to recover data that is not read properly the first time. However, these steps are typically performed in a predetermined order, which is applied the same regardless of the tape cartridge or the tape cartridge/drive combination. Accordingly, it would be beneficial to have a tape drive system that is capable of adjusting the ERP according to a specific tape cartridge or tape cartridge/drive combination according to prior knowledge of the operating characteristics of the specific tape cartridge and/or tape cartridge/drive combination.

BRIEF SUMMARY

In one embodiment, a tape drive system includes a read channel, a write channel, logic adapted for accessing data sets using the read channel and/or the write channel, logic adapted for counting each data set access using the read channel that used ERP, logic adapted for counting each data set access using the read channel that did not use ERP, logic adapted for counting each data set access using the write channel that used ERP, logic adapted for counting each data set access using the write channel that did not use ERP, and logic adapted for accessing subsequent data sets using the read channel and/or the write channel, wherein any subsequent data set access that uses ERP is accessed using an initial ERP step characterized by a first tape speed, wherein the first tape speed is selected at least partially based on the counts.

In another embodiment, a system includes logic adapted for creating data set reading and writing statistics for a tape drive/cartridge combination, wherein the statistics include: a number of data sets that were read without ERP, a number of data sets that were read with ERP, a number of data sets that were written without ERP, a number of data sets that were written with ERP, a tape speed at which each data set was read or written, and a ratio for each tape speed, the ratio being calculated by dividing a number of data sets written or read without ERP at the tape speed by a total number of data sets written or read at the tape speed, logic adapted for receiving a request to read or write a data set using ERP, and logic adapted for choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

In yet another embodiment, a method includes accessing data sets using a tape drive, wherein the accessing includes at least one of reading and writing, counting each data set read that used ERP, counting each data set read that did not use ERP, counting each dataset write that used ERP, counting each data set write that did not use ERP, and accessing subsequent data sets, wherein any subsequent data set access that uses ERP is accessed using an initial ERP step characterized by a first tape speed, wherein the first tape speed is selected at least partially based on the counts.

According to another embodiment, a method includes creating data set reading and writing statistics for a tape drive/cartridge combination, wherein the statistics include: a number of data sets that were read without ERP, a number of data sets that were read with ERP, a number of data sets that were written without ERP, a-number of data sets that were written with ERP, a tape speed at which each data set was read or written, and a ratio for each tape speed, the ratio being calculated by dividing a number of data sets written or read without ERP at the tape speed by a total number of data sets written or read at the tape speed, receiving a request to read or write a data set using ERP, and choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrates by way of example the principles of the invention.

DETAILED DESCRIPTION

Figure 1:
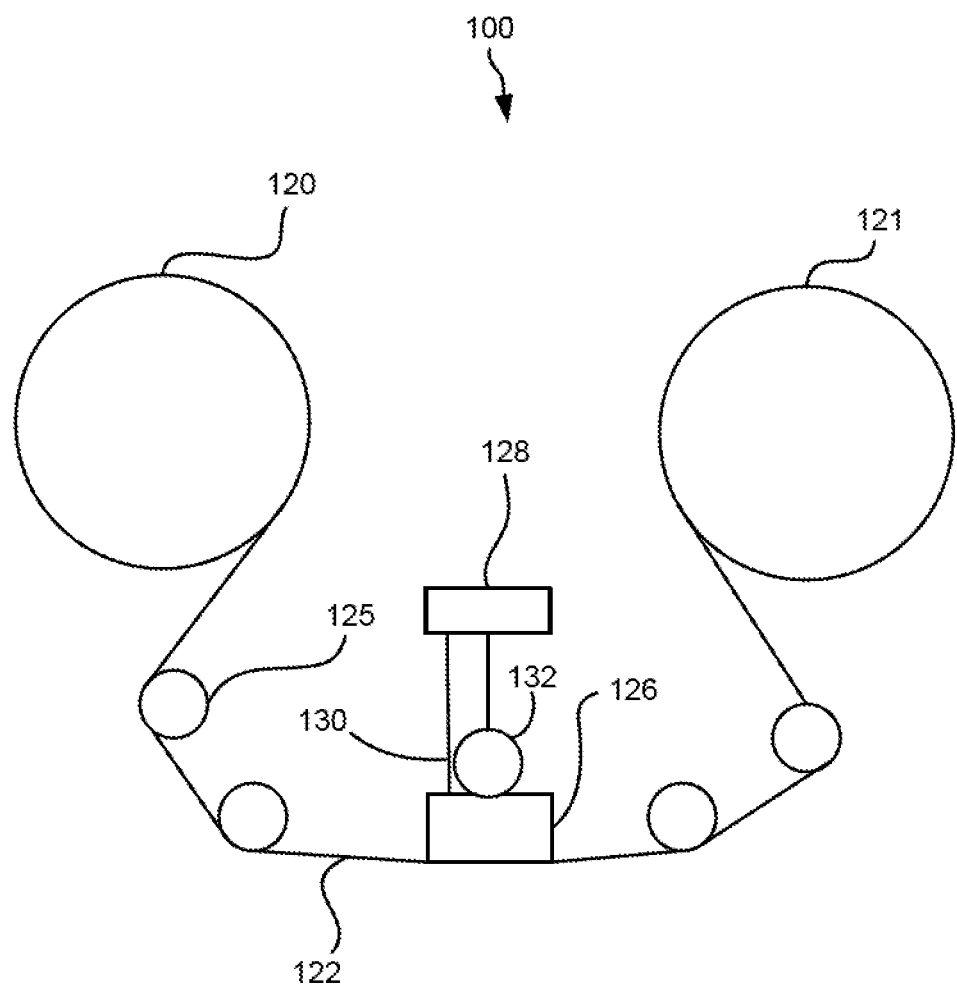
FIG. 1 illustrates a simplified tape drive of a tape-based data storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, a tape error recovery procedure (ERP) chooses an estimated best tape speed at which to perform a first ERP step in a sequence of ERP steps in order to have a better chance of succeeding earlier in the ERP procedure.

In one general embodiment, a tape drive system includes a read channel, a write channel, logic adapted for accessing data sets using the read channel and/or the write channel, logic adapted for counting each data set access using the read channel that used ERP, logic adapted for counting each data set access using the read channel that did not use ERP, logic adapted for counting each data set access using the write channel that used ERP, logic adapted for counting each data set access using the write channel that did not use ERP, and logic adapted for accessing subsequent data sets using the read channel and/or the write channel, wherein any subsequent data set access that uses ERP is accessed using an initial ERP step characterized by a first tape speed, wherein the first tape speed is selected at least partially based on the counts.

In another general embodiment, a system includes logic adapted for creating data set reading and writing statistics for a tape drive/cartridge combination, wherein the statistics include: a number of data sets that were read without ERP, a number of data sets that were read with ERP, a number of data sets that were written without ERP, a number of data sets that were written with ERP, a tape speed at which each data set was read or written, and a ratio for each tape speed, the ratio being calculated by dividing a number of data sets written or read without ERP at the tape speed by a total number of data sets written or read at the tape speed, logic adapted for receiving a request to read or write a data set using ERP, and logic adapted for choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

In yet another general embodiment, a method includes accessing data sets using a tape drive, wherein the accessing includes at least one of reading and writing, counting each data set read that used ERP, counting each data set read that did not use ERP, counting each data set write that used ERP, counting each data set write that did not use ERP, and accessing subsequent data sets, wherein any subsequent data set access that uses ERP is accessed using an initial ERP step characterized by a first tape speed, wherein the first tape speed is selected at least partially based on the counts.

According to another general embodiment, a method includes creating data set reading and writing statistics for a tape drive/cartridge combination, wherein the statistics include: a number of data sets that were read without ERP, a number of data sets that were read with ERP, a number of data sets that were written without ERP, a number of data sets that were written with ERP, a tape speed at which each data set was read or written, and a ratio for each tape speed, the ratio being calculated by dividing a number of data sets written or read without ERP at the tape speed by a total number of data sets written or read at the tape speed, receiving a request to read or write a data set using ERP, and choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

As will be appreciated by one skilled in the art, aspects of the present invention may be embodied as a system, method or computer program product. Accordingly, aspects of the present invention may take the forth of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a simplified tape drive 100 of a tape-based data storage system, which may be employed according to various embodiments. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel and controls head functions, such as track following, writing, reading, etc. The cable 130 may include read/write circuits to transmit data to the head 126 to be recorded on the tape 122 and to receive data read by the head 126 from the tape 122. An actuator 132 determines position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

As a tape drive, such as the tape drive 100 shown in FIG. 1, according to one embodiment, reads data from a tape, there are many different ways of determining if the read is successful or not, and there are varying degrees of successful reads. Analytically, any number of categories may be defined for tape reading performance. For example, in a two-category system, the read may fall into one of two categories: in a first category, the tape failed to read because the data was not capable of being read from the tape, or, in a second category, the tape successfully read when the data on the tape is capable of being read. Of course, this is overly simplified, as data may be read faster, more accurately, with less retries, etc., all of which factor Into how successful the tape read was.

Figure 2:
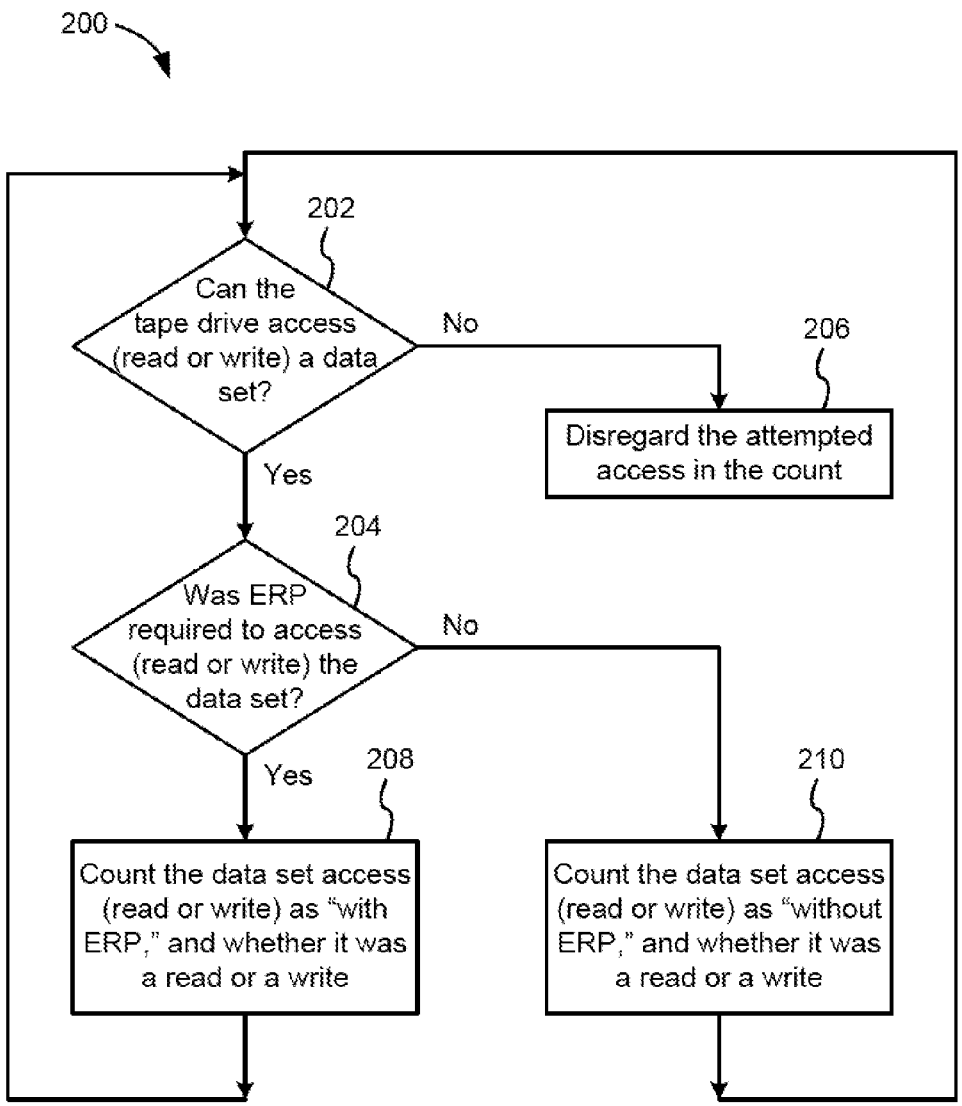
FIG. 2 is a flowchart of a method, according to one embodiment.

Now referring to FIG. 2, a method 200 for counting tape drive read/writes for a particular tape drive/cartridge combination is shown, according to one embodiment. The method 200 may be performed using a tape drive as shown in FIG. 1, or any other tape drive known in the art.

Referring again to FIG. 2, in operation 202, it is determined if the tape drive is capable of accessing (reading or writing) a data set. Although there are other types of accesses, for the sake of simplicity, an access when used to herein refers to a read or a write. This may be a first attempted read of a first data set, or it may be a next attempted read of a data set using a different tape speed, modified read/write channel parameters, a combination of changes, etc., such as would be performed in subsequent ERP steps. This is indicated by the arrows leading out from operations 208 and 210 into the top of operation 202.

If the data set cannot be accessed by the tape drive in operation 202, then in operation 206 the attempted access is disregarded in the context of the count. Failed accesses may be used for other purposes, such as beginning ERP in order to access the data set using some other parameters and/or tape speeds, after which it is determined again in operation 202 whether the data set can be accessed or not. Preferably, the count is only maintained for successful accesses, whether using ERP or not.

After it is determined that the access was successful, e.g., that the data set could be read or written, in operation 204, it is determined if ERP was used for the access.

If ERP was used, as shown in operation 208, the access is recorded as "with ERP" in statistics for the tape drive/cartridge combination along with whether the access was a read or a write.

If ERP was not used for the access, as shown in operation 210, the access is recorded as "without ERP" in the statistics for the tape drive/cartridge combination along with whether the access was a read or a write.

Along with the counts for data set accesses for the tape drive/cartridge combination, a speed at which each access was successful may also be recorded in the statistics, thereby allowing analysis of tape speeds for data set reads and writes for a particular tape drive/cartridge combination.

For the remainder of the descriptions included herein, a five category system is described. Of course, any number of categories and thresholds for determining the categories may be used, as would be apparent to one of skill in the art upon reading the present descriptions, such as two, three, four, six, ten, etc., categories, each relating to different tape speeds, performance criteria, and/or tape drive/cartridge combination parameters.

In one embodiment, five categories may be defined for different speeds of tape drive operation during tape reading/writing, for use by ERP.

Category 1: A speed or speeds which are very successful in accessing data sets without any ERP being used for the access.

Category 2: Marginal tape speed where data sets may be successfully accessed with only a minor subset of those data sets using ERP for the access.

Category 3: Marginal tape speed(s) which are successfully used during accessing that use ERP, but when the marginal tape speed(s) is/are maintained for continued data set access without ERP, they tend to reproduce more errors and lead to further ERP action.

Category 4: Tape speed(s) at which it is not possible to read or write at all.

Category 5: Not enough data collected to determine a read/write error rate.

Category speeds reflect the dynamics of a particular tape cartridge/drive combination. After a sufficient amount of data has been processed (such that the combination is no longer in Category 5 since a sufficient amount of data sets have been read or written at this tape speed), current mount history may be used to assign speeds to the Category groupings. This information may then be used to modify default speed selection for the tape drive to use during a first ERP step prior to performing conventional ERP.

For example, some typical ERP steps are shown below. When the tape drive cannot read the data, the tape drive may attempt ERP in the following sequence, according to one exemplary embodiment:

1. Try to read the data with a fastest speed.
2. Try to read the data with modified read/write channel parameters and the fastest tape speed.
3. Try to read the data with a slowest speed.
4. Try to read the data with modified read/write channel parameters and the slowest tape speed.

Tape speed is just one parameter that may be modified and/or optimized for any error recovery process. The schemes and methods presented herein for tape speed may be applied to other parameters as well to read/write the data.

Statistically, faster tape speeds have been found to perform better during ERP, which is why they are tried first in the exemplary embodiment. However, if the fastest speed has been dynamically rated at a Category 3 speed for this mount (tape cartridge/drive combination), then there is a risk of recovering at that speed in step 1 or step 2. Note that a Category 3 tape speed is a marginal speed selection with some success in recovery, but not for normal read/write operations. Since the recovery tape speed is maintained for the next data read/write, a Category 3 selection may cause errors requiring further ERP very quickly after the tape is run. In a worst case scenario, this may lead to ERP being invoked for every data read/write, causing severe performance degradation, latency, etc.

In the above described standard sequence, a slower tape speed might be dynamically rated as a Category 1 speed. Accordingly, a method that is capable of overriding an early Category 3 speed selection in ERP in favor of a better speed category would be useful in obtaining good read/write characteristics more quickly, for a smooth, successful transition back to read/write after ERP.

According to one embodiment, the error rate per tape speed may be monitored using any method known in the art, and a tape speed that results in a better chance of providing good read/write characteristics may be chosen with which to perform ERP in an earlier ERP step, such as a Category 1 or a Category 2 tape speed as described herein. In this way, the ERP is given the best chance of succeeding early on in the process, rather than running through all steps in a predetermined order which does not account for speed related issues.

In one approach, a Category 1 or a Category 2 tape speed is selected to use as a first step in the ERP sequence. If a Category 3 tape speed is selected in the first step before a Category 1 or Category 2 tape speed is used, the error may sometimes be recovered, but this may cause performance degradation in the future reads/writes.

Figure 3:
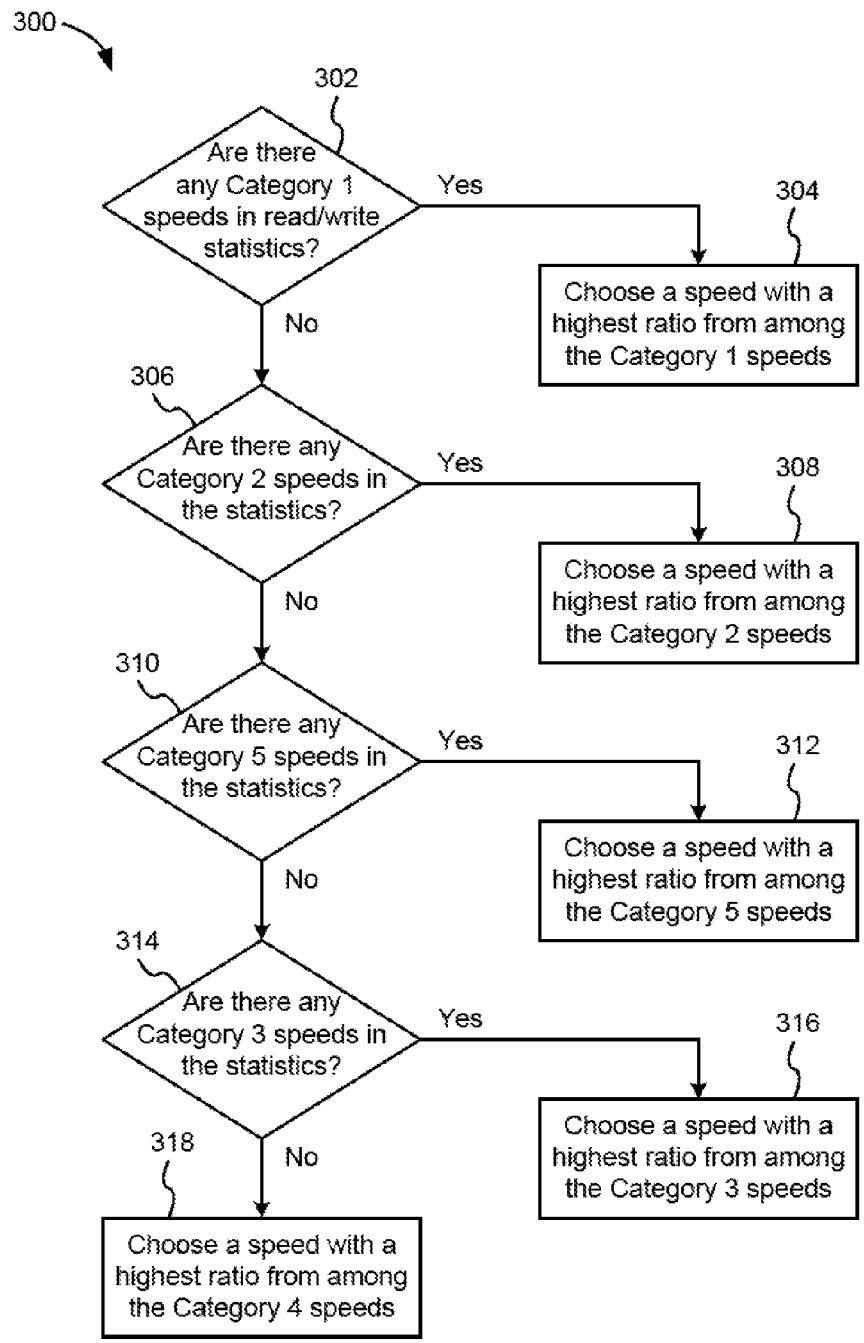
FIG. 3 is a flowchart of a method, according to one embodiment.

Now referring to FIG. 3, one such method 300 is shown according to one embodiment. The method 300 may be carried out in any desired environment, and may make used of a tape drive, such as the tape drive 100 shown in FIG. 1, or any other tape drive system known in the art.

Referring again to FIG. 3, in operation 302, it is determined if there are any Category 1 speeds listed in the read/write statistics that are gathered for a particular tape drive/cartridge combination. If there are speeds that fall into Category 1, which relates to those tape speeds with little or no recovered error counts, then the speed with the highest ratio, (data sets read or written without ERP)/(total data sets read or written), is chosen from the speeds that fall into Category 1 in operation 304.

If no speeds fall into Category 1, then in operation 306, it is determined if there are any Category 2 speeds listed in the read/write statistics that are gathered for a particular tape drive/cartridge combination. If there are speeds that fall into Category 2, which relates to marginal tape speed with many recovered errors possible, then the speed with the highest ratio, (data sets read or written without ERP)/(total data sets read or written), is chosen from the speeds that fall into Category 2 in operation 308.

If no speeds fall into Category 2, then in operation 310, it is determined if there are any Category 5 speeds listed in the read/write statistics that are gathered for a particular tape drive/cartridge combination. If there are speeds that fall into Category 5, which relates to speeds for which there is not enough data collected to determine a read/write error rate, then the speed with the highest ratio, (data sets read or written without ERP)/(total data sets read or written), is chosen from the speeds that fall into Category 5 in operation 312.

If no speeds fall into Category 5, then in operation 314, it is determined if there are any Category 3 speeds listed in the read/write statistics that are gathered for a particular tape drive/cartridge combination. If there are speeds that fall into Category 3, which relates to marginal tape speeds with the errors possibly recovered through retries, but leads to the errors being reproduced with the tape speed used for ERP, then the speed with the highest ratio, (data sets read or written without ERP)/(total data sets read or written), is chosen from the speeds that fall into Category 3 in operation 316.

If no speeds fall into Category 5, then in operation 314, it is determined if there are any Category 3 speeds listed in the read/write statistics that are gathered for a particular tape drive/cartridge combination. If there are speeds that fall into Category 3, which relates to marginal tape speeds with the errors possibly recovered through retries, but leads to the errors being reproduced with the tape speed used for ERP, then the speed with the highest ratio, (data sets read or written without ERP)/(total data sets read or written), is chosen from the speeds that fall into Category 3 in operation 316.

If no speeds fall into Category 3, then in operation 318, as a last resort, a speed which falls into Category 4 is chosen, with Category 4 relating to not being able to read or write at all at this tape speed. Obviously, this is not ideal, but it simply means that this tape drive/cartridge combination is not performing properly and should be checked or replaced. Of course, the speed with the highest ratio, (data sets read or written without ERP)/(total data sets read or written), is chosen from the speeds that fall into Category 4.

In order to determine which speeds fall into which categories, an error rate monitoring method may be used to identify which of Category 1 to Category 5 tape speed is being used while the tape drive reads or writes the data, according to some embodiments, to produce a current mount history. In one such embodiment, the method 200 described in FIG. 2 may be used, or a method similar to method 200, according to various embodiments. This current mount history may be used to dynamically select a speed to use during error recovery (ERP) which is optimal to both recovery and nominal read/write. This eliminates or otherwise reduces unnecessary error recovery that can lead to degraded data processing.

Figure 4:
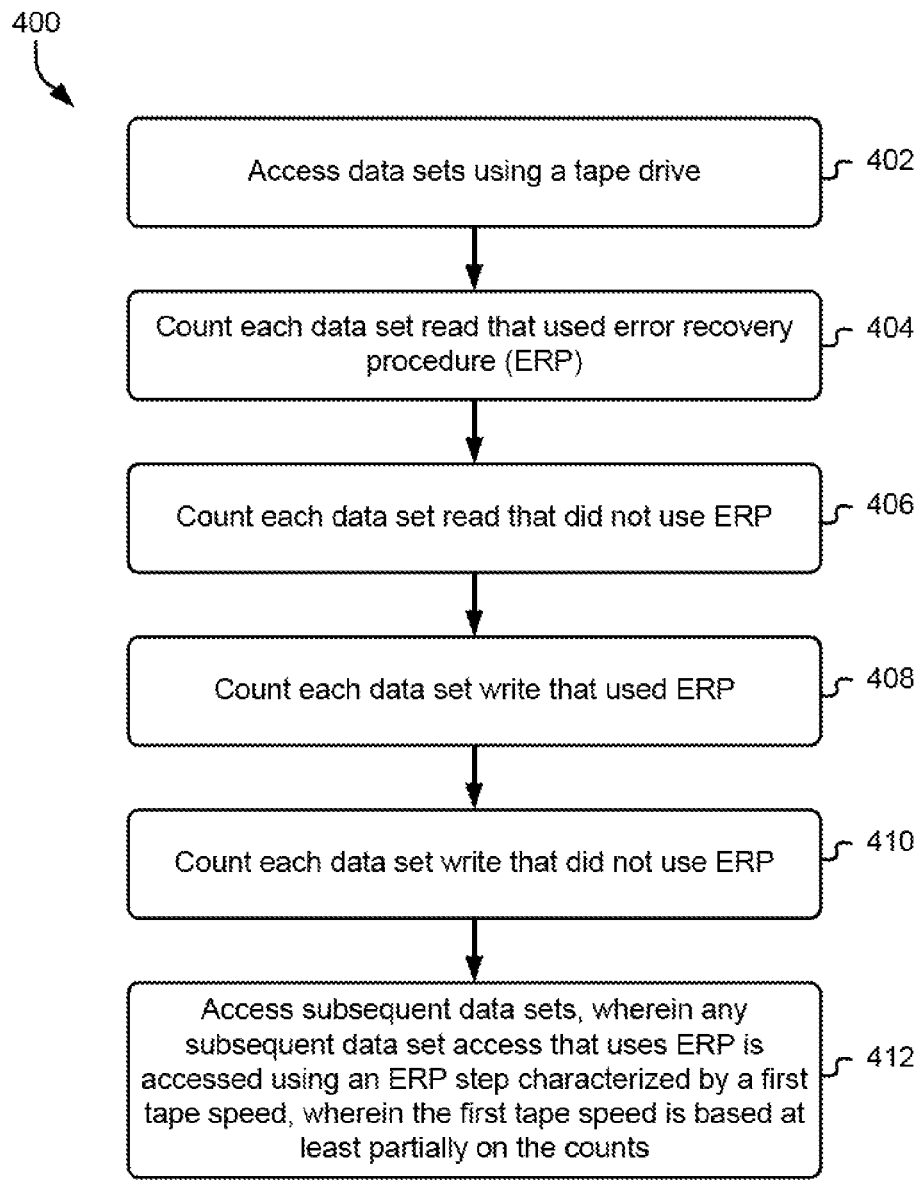
FIG. 4 is a flowchart of a method, according to one embodiment.

Now referring to FIG. 4, a method 400 is shown according to one embodiment. As an option, the present method 400 may be implemented in the context of the functionality and architecture of FIG. 1. However, method 400 may be carried out in any desired environment. It should be noted that the aforementioned definitions may apply during the present description, and that method 400 may include more or less operations than those described herein, according to various embodiments.

In operation 402, data sets are accessed using a tape drive. The data sets are accessed by at least one of reading and writing. Of course, other functions may be performed during an access, but for the purposes of this description, accessing will be limited to either reading or writing. In addition, it is assumed that the writing process involves a readback feature. Therefore, after a data set is written, it is read back from the tape to determine if what was supposed to be written is what is read back from the tape after being written. Accordingly, the writing process actually involves a reading process, but may be considered as a writing process for the sake of these descriptions.

In operation 404, each data set read that used ERP is counted, such as by using a counter that is incremented by one for each data set read that used ERP. If the data set is not able to read, it is not counted until it is capable of being read.

In operation 406, each data set read that did not use ERP is counted, such as by using a counter that is incremented by one for each data set read that did not use ERP. Of course, if only writing is occurring during a particular mount, operations 404 and 406 may not be performed, or may simply render a result of zero.

In addition, in some embodiments, the counting of each data set (with or without ERP) may also include a tape speed at which the read occurred. Other statistics may also be included, as described herein or known to those of skill in the art.

In operation 408, each data set write that used ERP is counted, such as by using a counter that is incremented by one for each data set write that used ERP.

In operation 410, each data set write that did not use ERP is counted, such as by using a counter that is incremented by one for each data set write that did not use ERP. Of course, if only reading is occurring during a particular mount, operations 408 and 401 may not be performed, or may simply render a result of zero.

In operation 412, subsequent data sets are accessed. For any subsequent data set accesses (reads or writes) that require the use of ERP, the data sets are accessed using an initial ERP step characterized by a first tape speed. The first tape speed is selected at least partially based on the counts from operation 404, 406, 408, and/or 410.

In a further embodiment, one of a plurality of tape speeds at which each read or write (access) occurred may be stored, such as to a computer readable storage medium, of a type known in the art. Furthermore, a ratio may be calculated for each of the plurality of tape speeds. The ratio may equal a number of data sets accessed without ERP at the tape speed divided by a total number of data sets accessed at the tape speed, e.g., ratio=(ERP data sets)/(ERP data sets+non-ERP data sets).

According to another embodiment, the first tape speed may be selected from the plurality of tape speeds preferentially according to the following order: a fastest tape speed of the plurality of tape speeds which corresponds to a highest ratio that is at least a performance threshold and for which the total number of data sets accessed is at least a count threshold, a fastest tape speed of the plurality of tape speeds which corresponds to a highest ratio and for which the total number of data sets accessed is less than the count threshold, and a fastest tape speed of the plurality of tape speeds which corresponds to a highest ratio that is less than the performance threshold and for which the total number of data sets accessed is at least the count threshold. Of course, there may be other speeds selected between the speeds which fall into these distinct groups, as would be understood by one of skill in the art.

In one such embodiment, the performance threshold may be between 74 and 95%, e.g., about 80%, and the count threshold may be less than 100, e.g., about 50. Of course, any performance threshold may be used, such as 95%, 90%, 85%, 75%, 50%, etc. Also, any count threshold may be used, such as 25 counts, 40 counts, 75 counts, 100 or more counts, etc. Also, any combination of performance threshold and count threshold may be used, such as 90%/40 counts, 75%/100 counts, etc. In addition, either of the performance threshold and/or the count threshold may be dynamically changed to reflect current operating conditions of the current mount (tape drive/cartridge combination).

In another embodiment, the plurality of speeds may be categorized according to their performance characteristics. For example, categorizing may comprise: assigning any speed corresponding to a ratio that is at least a first performance threshold and for which the total data sets accessed is at least a count threshold to a first category, assigning any speed corresponding to a ratio that is less than the first performance threshold and at least a second performance threshold and for which the total data sets accessed is at least the count threshold to a second category, assigning any speed corresponding to a ratio that less than the second performance threshold and at least a third performance threshold and for which the total data sets accessed is at least the count threshold to a third category, assigning any speed corresponding to a ratio that less than the third performance threshold and for which the total data sets accessed is at least the count threshold to a fourth category, and assigning any speed for which the total data sets accessed is less than the count threshold to a fifth category.

In the immediately aforementioned embodiment, for example, the first performance threshold may be about 90%, the second performance threshold may be about 80%, the third performance threshold may be about 50%, and the count threshold may be about 50. Of course, any performance thresholds may be used, such as 95%, 90%, 85%, 75%, 50%, 40%, 30%, etc: Also, any count threshold may be used, such as 25 counts, 40 counts, 75 counts, 100 or more counts, etc. Also, any combination of performance thresholds and count threshold may be used. In addition, any of the performance thresholds and/or the count threshold may be dynamically changed to reflect current operating conditions of the current mount (tape drive/cartridge combination).

Furthermore, method 400 and embodiments thereof may be performed using a tape drive system. For example, in one such embodiment, a tape drive system may include a read channel, a write channel, and logic adapted for performing method 400 by receives data from the read and/or write channel.

Additionally, in some embodiments, the tape drive system may comprise a magnetic head for providing signals to the read channel and/or the write channel, a drive Mechanism adapted for passing a magnetic medium over the magnetic head, and a controller electrically coupled to the magnetic head, the controller being adapted for controlling operation of the magnetic head.

In general, any ERP sequence includes many steps (with each step being a retry of reading data from a given dataset). According to the embodiments presented herein, each retry may be attempted with a different tape speed or using different hardware settings until the error is recovered, and the read sequence is static. A static ERP sequence, such as the ERP sequence presented below, may be used, in one implementation. The ERP steps may be executed in the order shown in the following table until the error is recovered.

TABLE 1

| ERP Step | Speed | Channel Parameters |
|---|---|---|
| 1 | 1 | A |
| 2 | 4 | A |
| 3 | 7 | A |
| 4 | 10 | A |
| 5 | 13 | A |
| 6 | 1 | B |
| 7 | 4 | B |
| 8 | 7 | B |
| 9 | 10 | B |
| 10 | 13 | B |
| 11 | 2 | C |
| 12 | 5 | C |
| 13 | 8 | C |
| 14 | 11 | C |
| 15 | 14 | C |

In this table, the channel parameter (A, BS, etc.) is a generalized notation indicating any particular channel parameter setting. Any channel parameters may be changed from Channel parameter A, B, C, etc. Some illustrative channel parameters include, but are not limited to, channel calibration changes, channel filters, encode/decode parameters, etc.

Also, the tape speed used in this table assumes that fourteen tape speeds are possible in the tape drive, 1-14, where 1 is the highest relative tape speed and 14 is the slowest relative tape speed. Of course, any number of tape drive speeds may be used, and the table illustrates that it is preferred to attempt the read/write using a broad range of speeds for any channel parameter combination.

For example, using an IBM LTO/TS1140 tape drive, data may be read/written from/to tape. The data unit to read/write is called a data set. When a data set cannot be read/written, the tape drive invokes ERP. While the tape drive is reading/writing the data sets, the chive counts up the number of read/written data sets with or without ERP (per tape speed). The exemplary table produced below shows exemplary Data Set Read Counts with and without ERP, Total Data Set Read Counts, Ratio values, and exemplary Categories for which these reads would fit.

In one embodiment, the data set counts may be stored to a knowledge base for the duration of a tape mount in a tape drive. In addition, in some approaches, a microcode counter may be used for counting a number of data sets read, with and without ERP.

TABLE 2

| Speed | Data Set Read Counts w/o ERP | Data Set Read Counts w/ ERP | Total Data Set Read Count | Ratio | Category |
|---|---|---|---|---|---|
| 1 | 10 | 4 | 14 | 71.4% | 5 |
| 2 | 0 | 0 | 0 | N/A | 5 |
| 3 | 1000 | 200 | 12000 | 83.3% | 2 |
| 4 | 1 | 0 | 1 | 100% | 5 |
| 5 | 0 | 0 | 0 | N/A | 5 |
| 6 | 0 | 0 | 0 | N/A | 5 |
| 7 | 10000 | 1000 | 11000 | 90.9% | 1 |
| 8 | 10 | 2 | 12 | 83.3% | 2 |
| 9 | 20 | 30 | 50 | 40.0% | 4 |
| 10 | 100 | 2 | 102 | 98.0% | 1 |
| 11 | 500 | 330 | 830 | 60.2% | 3 |
| 12 | 0 | 0 | 0 | N/A | 5 |
| 13 | 0 | 0 | 0 | N/A | 5 |
| 14 | 1000 | 0 | 1000 | 100% | 1 |

In this exemplary table, presented for the sake of description only, "Ratio" is a percentage determined by taking the "Data Set Read Counts w/o ERP" and dividing it by the "Total Data Set Read Count"*100%, and it indicates which tape speed is most reliable for longer durations. If the category is defined by some predetermined speed thresholds, each speed may be categorized according to the system shown below, according to one approach, or some other suitable system or method. Of course, any speed thresholds may be used, according to practical experience that is possessed by one of skill in the art.

In one embodiment, statistics (such as tape speed) may be collected by direction (e.g., forward from beginning of tape to end of tape and then backward from end of tape to beginning of tape), by access type (e.g., aggregated by reads and writes), by whether the dataset was written by another drive or by this drive (in the case of reading a data set), etc.

In one embodiment, the speed thresholds may be defined as follows:

Threshold 1: 90%
Threshold 2: 80%
Threshold 3: 50%
Threshold 4: 50 counts

Using these exemplary thresholds, the categories that were described previously may be quantified in relation to the Ratio. In one embodiment, the speed categories may be defined as follows:

Category 1: Ratio≥Threshold 1
Category 2: Threshold 1>Ratio≥Threshold 2
Category 3: Threshold 2>Ratio≥Threshold 3
Category 4: Ratio<Threshold 3
Category 5: "Total Data Set Read Count"<Threshold 4

As can be seen above, Categories 1-4 rely on the Ratio calculation, which depends on Data Set Read Counts with and without ERP (which also provide the denominator of "Total Data Set Read Count"). Category 5 depends on only the "Total Data Set Read Count." Accordingly, it is always checked whether Category 5 exists prior to determining if any of Categories 1-4 exist. In other words, each of Category 1-4 also implicitly require that "Total Data Set Read Count">Threshold 4.

According to one embodiment, ERP may be carried out using a step 0 in addition to conventional ERP steps, as described herein. This step 0 may be the beginning step of the ERP sequence if it is a static sequence. This step 0 selects a best speed with which to run the ERP at to avoid a burst error situation.

Now referring to the following table, an ERP sequence is shown with a preliminary step 0 inserted before all other typical ERP steps. In this step 0, according to one embodiment, a tape speed (X) is chosen or selected which provides the best chance at reading and/or writing with little or no recovered error in future reads/writes.

TABLE 3

| ERP Step | Speed | Channel Parameters |
|---|---|---|
| 0 | X | A |
| 1 | 1 | A |
| 2 | 4 | A |
| 3 | 7 | A |
| 4 | 10 | A |
| 5 | 13 | A |
| 6 | 1 | B |
| 7 | 4 | B |
| 8 | 7 | B |
| 9 | 10 | B |
| 10 | 13 | B |
| 11 | 2 | C |
| 12 | 5 | C |
| 13 | 8 | C |
| 14 | 11 | C |
| 15 | 14 | C |

In this table, the channel parameter (A, B, C, etc.) is a generalized notation indicating any particular channel parameter setting. Any channel parameters may be changed from Channel parameter A, B, C, etc. Some illustrative channel parameters include, but are not limited to, channel calibration changes, channel filters, encode/decode parameters, etc.

Also, the tape speed used in this table assumes that fourteen tape speeds are possible in the tape drive, 1-14. Of course, any number of tape drive speeds may be used, such as 5 speeds, 10 speeds, 20 speeds, etc., and the table illustrates that it is preferred to attempt the read/write using a broad range of speeds for any channel parameter combination, starting with a fastest speed.

Figure 5:
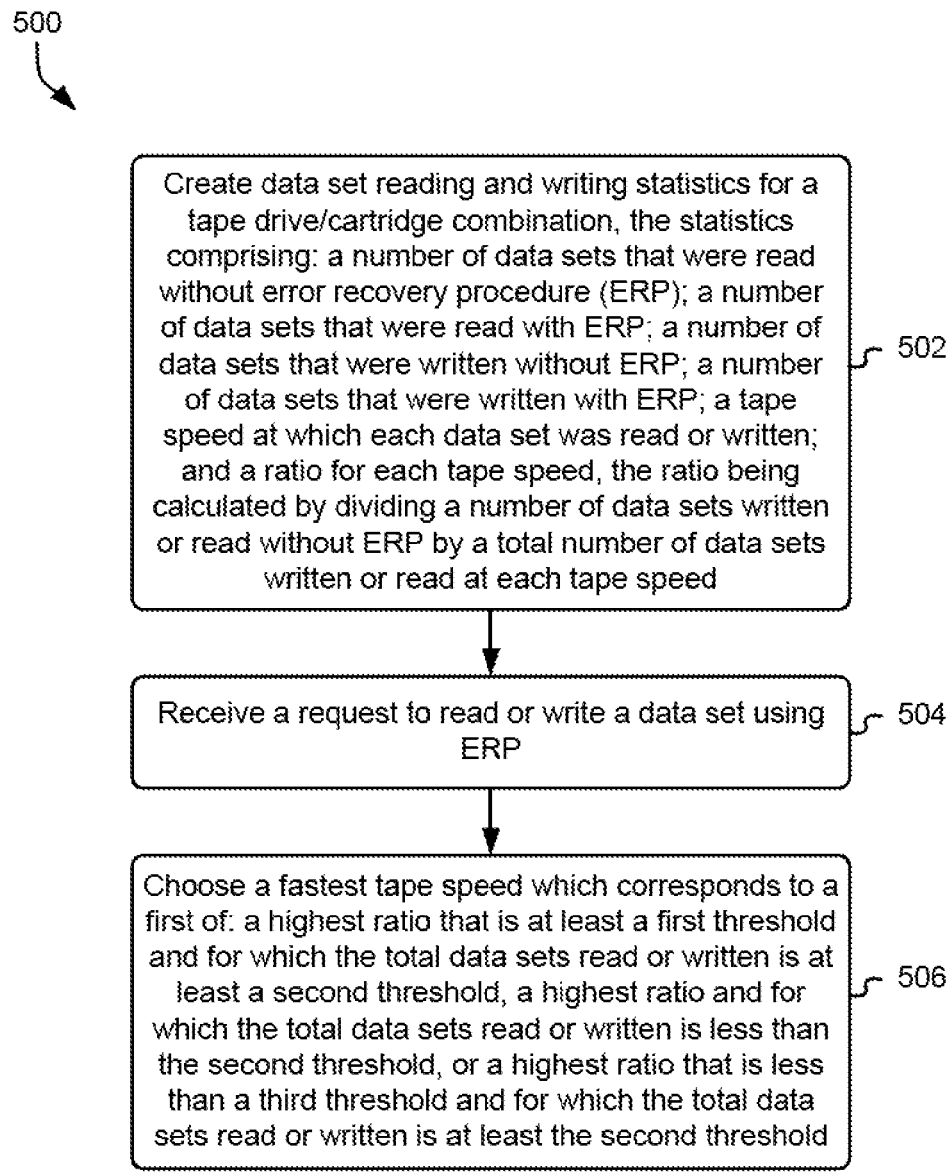
FIG. 5 is a flowchart of a method, according to one embodiment.

Now referring to FIG. 5, a method 500 is shown according to one embodiment. As an option, the present method 500 may be implemented in the context of the functionality and architecture of FIG. 1. However, method 500 may be carried out in any desired environment. It should be noted that the aforementioned definitions may apply during the present description, and that method 500 may include more or less operations than those described herein, according to various embodiments.

In operation 502, data set reading and writing statistics are created for a tape drive/cartridge combination (mount). Any method for assembling the statistics may be used as known in the art. In one embodiment, the statistics comprise: a number of data sets that were read without ERP, a number of data sets that were read with ERP, a number of data sets that were written without ERP, a number of data sets that were written with ERP, a tape speed at which each data set was read or written, and a ratio for each tape speed, the ratio being calculated by dividing a number of data sets written or read without ERP at the tape speed by a total number of data sets written or read at the tape speed.

Any method of determining and storing the tape speed may be used as would be known to one of skill in the art. Furthermore, each of the ratios (for each tape speed) may be dynamically calculated over the life of the mount as more and more data is collected regarding reads and writes of data sets at different tape speeds. In this way, speeds may dynamically move between categories over the course of the mount to more accurately reflect performance characteristics at each speed.

In operation 504, a request to read or write a data set is received, the reading or writing being determined to use ERP, e.g., the read or write did not complete successfully, so ERP is initiated to try and recover the error.

In operation 506, a fastest tape speed is chosen from a plurality of tape speeds (all the tape speeds available to the tape drive/cartridge combination) which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

In one embodiment, the second performance threshold may be between 74 and 95%, e.g., about 80% and the count threshold may be less than 100, e.g., 50. Of course, any performance threshold may be used, such as 95%, 90%, 85%, 75%, 50%, 40%, 30%, etc. Also, any count threshold may be used, such as 25 counts, 40 counts, 75 counts, 100 counts, etc. Also, any combination of performance thresholds and count threshold may be used. In addition, any of the performance thresholds and/or the count threshold may be dynamically changed to reflect current operating conditions of the current mount (tape drive/cartridge combination).

In a further embodiment, the method 500 may include categorizing the plurality of speeds. In this embodiment, the categorizing may comprise: assigning any speed corresponding to a ratio that is at least a first performance threshold and for which the total data sets accessed is at least the count threshold to a first category, assigning any speed corresponding to a ratio that is less than the first performance threshold and at least the second performance threshold and for which the total data sets accessed is at least the count threshold to a second category, assigning any speed corresponding to a ratio that less than the second performance threshold and at least a third performance threshold and for which the total data sets accessed is at least the count threshold to a third category, assigning any speed corresponding to a ratio that less than the third performance threshold and for which the total data sets accessed is at least the count threshold to a fourth category, and assigning any speed for which the total data sets accessed is less than the count threshold to a fifth category.

In this way, the better tape speeds for writing and reading performance are assigned to the first and second categories, while the poor tape speeds for writing and reading are assigned to the third and fourth categories. The fifth category is reserved for speeds at which little or no data is known, and there is a statistically insignificant amount of data from which to draw a conclusion about the performance characteristics of the tape at these speeds/settings.

In one further approach, the first performance threshold may be about 90%, the second performance threshold may be about 80%, the third performance threshold may be about 50%, and the count threshold may be about 50. Of course; any performance thresholds may be used, such as 95%, 90%, 85%, 75%, 50%, 40%, 30%, etc., as long as the ratios decrease from category 1 to category 4. Also, any count threshold may be used, such as 25 counts, 40 counts, 75 counts, 100 counts, etc., as long as it is believed that the count threshold signifies a significant collection of data from which to draw a conclusion as to the operating characteristics of the tape drive/cartridge combination. Also, any combination of performance thresholds and count threshold may be used. In addition, any of the performance thresholds and/or the count threshold may be dynamically changed to reflect current operating conditions of the current mount (tape drive/cartridge combination).

In another embodiment, the fastest tape speed may be chosen from the plurality of tape speeds by selecting a fastest tape speed from, in preferential order: the first category, the second category, the fifth category, the third category, and the fourth category. These categories, in one approach, may be similar to the Category 1 through Category 5 speeds described herein.

The reason why the tape drive tries to select the Category 5 speed earlier than Category 3, or Category 4 is that it is desired to avoid using Category 3 or Category 4 as much as possible, since in these Categories, it is known that there will be tape performance degradation possible. Category 5 will have unknown effects, since there were not enough data sets read in order to formulate a persistent opinion, and therefore Category 5 is just as likely to produce better results than Category 3 or Category 4 than it is to produce worse results.

Furthermore, method 500 and embodiments thereof may be performed using a system. For example, in one such embodiment, a system may include a read channel, a write channel, and logic adapted for performing method 500 by receives data from the read and/or write channel.

If ERP steps are modified dynamically when the tape drive encounters an error, the sequence of ERP may be changed according to the Ratio in the counter table to achieve better results earlier in the ERP sequence. As an example of this effect, the following table presents times and error counts for six tape mounts (tape drive/cartridge combinations) implemented in an IBM TS1140 tape drive.

TABLE 4

| ERP Implementation | Elapsed Time (hours) | Total Number of Errors |
|---|---|---|
| Conventional | 6.2 | 324 |
| Conventional | 5.7 | 284 |
| Step 0 Added | 4.4 | 274 |
| Step 0 Added | 3.7 | 166 |
| Step 0 Added | 3.7 | 160 |
| Step 0 Added | 4.3 | 254 |

As this table shows, the elapsed time used in each ERP procedure was less when the step 0 was added, as described herein according to various embodiments. In addition, the total number of errors decreased for each mount using the step 0.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive system, comprising:
a read channel;
a write channel;
logic adapted for accessing data sets using the read channel and/or the write channel;
logic adapted for counting each data set access using the read channel that used error recovery procedure (ERP);
logic adapted for counting each data set access using the read channel that did not use ERP;
logic adapted for counting each data set access using the write channel that used logic adapted for counting each data set access using the write channel that did not use ERP; and
logic adapted for accessing subsequent data sets using the read channel and/or the write channel, wherein any subsequent data set access that uses ERP is accessed using an initial ERP step characterized by a first tape speed, wherein the first tape speed is selected at least partially based on the counts.

2. The tape drive system as recited in claim 1, wherein the counting is performed by incrementing a separate counter for each of: accesses through the read channel that used ERP, accesses through the read channel that did not use ERP, accesses through the write channel that used ERP, and accesses through the write channel that did not use ERP.

3. The tape drive system as recited in claim 1, further comprising:
logic adapted for storing one of a plurality of tape speeds at which each access occurred; and
logic adapted for calculating a ratio for each of the plurality of tape speeds, the ratio equaling a number of data sets accessed without ERP at the tape speed divided by a total number of data sets accessed at the tape speed.

4. The tape drive system as recited in claim 3, wherein the first tape speed is selected from the plurality of tape speeds preferentially in the following order:
a fastest tape speed of the plurality of tape speeds which corresponds to a highest ratio that is at least a performance threshold and for which the total number of data sets accessed is at least a count threshold;
a fastest tape speed of the plurality of tape speeds which corresponds to a highest ratio and for which the total number of data sets accessed is less than the count threshold; and
a fastest tape speed of the plurality of tape speeds which corresponds to a highest ratio that is less than the performance threshold and for which the total number of data sets accessed is at least the count threshold.

5. The tape drive system as recited in claim 4, wherein the performance threshold is between 74 and 95% and the count threshold is less than 100.

6. The tape drive system as recited in claim 3, further comprising logic adapted for categorizing the plurality of speeds, the logic adapted for categorizing comprising:
logic adapted for assigning any speed corresponding to a ratio that is at least a first performance threshold and for which the total number of data sets accessed is at least a count threshold to a first category;

logic adapted for assigning any speed corresponding to a ratio that is less than the first performance threshold and at least a second performance threshold and for which the total number of data sets accessed is at least the count threshold to a second category;

logic adapted for assigning any speed corresponding to a ratio that less than the second performance threshold and at least a third performance threshold and for which the total number of data sets accessed is at least the count threshold to a third category;

logic adapted for assigning any speed corresponding to a ratio that less than the third performance threshold and for which the total number of data sets accessed is at least the count threshold to a fourth category; and logic adapted for assigning any speed for which the total number of data sets accessed is less than the count threshold to a fifth category.

7. The tape drive system as recited in claim 6, wherein the first performance threshold is about 90%, the second performance threshold is about 80%, the third performance threshold is about 50%, and the count threshold is about 50.

8. The tape drive system as recited in claim 1, further comprising:
   a magnetic head for providing signals to the read channel and/or the write channel;
   a drive mechanism adapted for passing a magnetic medium over the magnetic head; and
   a controller electrically coupled to the magnetic head, the controller being adapted for controlling operation of the magnetic head.

9. A system, comprising:
   logic adapted for creating data set reading and writing statistics for a tape drive/cartridge combination, wherein the statistics comprise:
      a number of data sets that were read without error recovery procedure (ERP);
      a number of data sets that were read with ERP;
      a number of data sets that were written without ERP;
      a number of data sets that were written with ERP;
      a tape speed at which each data set was read or written; and
      a ratio for each tape speed, the ratio being calculated by dividing a number of data sets written or read without ERP at the tape speed by a total number of data sets written or read at the tape speed;
   logic adapted for receiving a request to read or write a data set using ERP; and
   logic adapted for choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the stun of data sets read and data sets written is at least the count threshold.

10. The system as recited in claim 9, wherein the second performance threshold is between 74 and 95% and the count threshold is less than 100.

11. The system as recited in claim 9, further comprising logic adapted for categorizing the plurality of speeds, the categorizing comprising:
   logic adapted for assigning any speed corresponding to a ratio that is at least a first performance threshold and for which the total data sets accessed is at least the count threshold to a first category;
   logic adapted for assigning any speed corresponding to a ratio that is less than the first performance threshold and at least the second performance threshold and for which the total data sets accessed is at least the count threshold to a second category;
   logic adapted for assigning any speed corresponding to a ratio that less than the second performance threshold and at least a third performance threshold and for which the total data sets accessed is at least the count threshold to a third category;
   logic adapted for assigning any speed corresponding to a ratio that less than the third performance threshold and for which the total data sets accessed is at least the count threshold to a fourth category; and
   logic adapted for assigning any speed for which the total data sets accessed is less than the count threshold to a fifth category.

12. The system as recited in claim 11, wherein the first performance threshold is about 90%, the second performance threshold is about 80%, the third performance threshold is about 50%, and the count threshold is about 50, and wherein the logic adapted for choosing the fastest tape speed from the plurality of tape speeds further comprises logic adapted for selecting a fastest tape speed from, in preferential order: the first category, the second category, the fifth category, the third category, and the fourth category.

13. A method, comprising:
   accessing data sets using a tape drive, wherein the accessing comprises at least one of reading and writing;
   counting each data set read that used error recovery procedure (ERP);
   counting each data set read that did not use ERP;
   counting each data set write that used ERP;
   counting each data set write that did not use ERP; and
   accessing subsequent data sets, wherein any subsequent data set access that uses ERP is accessed using an initial ERP step characterized by a first tape speed, wherein the first tape speed is selected at least partially based on the counts.

14. The method as recited in claim 13, further comprising:
   storing one of a plurality of tape speeds at which each read or write occurred; and
   calculating a ratio for each of the plurality of tape speeds, the ratio equaling a number of data sets accessed without ERP at the tape speed divided by a total number of data sets accessed at the tape speed.

15. The method as recited in claim 14, wherein the first tape speed is selected from the plurality of tape speeds preferentially in the following order:
   a fastest tape speed of the plurality of tape speeds which corresponds to a highest ratio that is at least a performance threshold and for which the total number of data sets accessed is at least a count threshold;
   a fastest tape speed of the plurality of tape speeds which corresponds to a highest ratio and for which the total number of data sets accessed is less than the count threshold; and
   a fastest tape speed of the plurality of tape speeds which corresponds to a highest ratio that is less than the performance threshold and for which the total number of data sets accessed is at least the count threshold.

16. The method as recited in claim 15, wherein the performance threshold is between 74 and 95% and the count threshold is less than 100.

17. The method as recited in claim 14, further comprising categorizing the plurality of speeds, the categorizing comprising:

assigning any speed corresponding to a ratio that is at least a first performance threshold and for which the total data sets accessed is at least a count threshold to a first category;

assigning any speed corresponding to a ratio that is less than the first performance threshold and at least a second performance threshold and for which the total data sets accessed is at least the count threshold to a second category;

assigning any speed corresponding to a ratio that less than the second performance threshold and at least a third performance threshold and for which the total data sets accessed is at least the count threshold to a third category;

assigning any speed corresponding to a ratio that less than the third performance threshold and for which the total data sets accessed is at least the count threshold to a fourth category; and assigning any speed for which the total data sets accessed is less than the count threshold to a fifth category.

18. The method as recited in claim 17, wherein the first performance threshold is about 90%, the second performance threshold is about 80%, the third performance threshold is about 50%, and the count threshold is about 50.

19. A method, comprising:
creating data set reading and writing statistics for a tape drive/cartridge combination, wherein the statistics comprise:
a number of data sets that were read without error recovery procedure (ERP);
a number of data sets that were read with ERP;
a number of data sets that were written without ERP;
a number of data sets that were written with ERP;
a tape speed at which each data set was read or written; and
a ratio for each tape speed, the ratio being calculated by dividing a number of data sets written or read without ERP at the tape speed by a total number of data sets written or read at the tape speed;

receiving a request to read or write a data set using ERP; and choosing a fastest tape speed from a plurality of tape speeds which corresponds to, in preferential order: a highest ratio that is at least a second performance threshold and for which a sum of data sets read and data sets written is at least a count threshold, a highest ratio and for which the sum of data sets read and data sets written is less than the count threshold, and a highest ratio that is less than the second performance threshold and for which the sum of data sets read and data sets written is at least the count threshold.

20. The method as recited in claim 19, wherein the second performance threshold is between 74 and 95% and the count threshold is less than 100.

21. The method as recited in claim 19, further comprising categorizing the plurality of speeds, the categorizing comprising:
assigning any speed corresponding to a ratio that is at least a first performance threshold and for which the total data sets accessed is at least the count threshold to a first category;

assigning any speed corresponding to a ratio that is less than the first performance threshold and at least the second performance threshold and for which the total data sets accessed is at least the count threshold to a second category;

assigning any speed corresponding to a ratio that less than the second performance threshold and at least a third performance threshold and for which the total data sets accessed is at least the count threshold to a third category;

assigning any speed corresponding to a ratio that less than the third performance threshold and for which the total data sets accessed is at least the count threshold to a fourth category; and assigning any speed for which the total data sets accessed is less than the count threshold to a fifth category.

22. The method as recited in claim 21, wherein the first performance threshold is about 90%, the second performance threshold is about 80%, the third performance threshold is about 50%, and the count threshold is about 50.

23. The method as recited in claim 22, wherein the choosing the fastest tape speed from the plurality of tape speeds further comprises selecting a fastest tape speed from, in preferential order: the first category, the second category, the fifth category, the third category, and the fourth category.

* * * * *